(12) United States Patent  (10) Patent No.: US 7,740,218 B2
Green  (45) Date of Patent: Jun. 22, 2010

(54) STABILITY SUPPORT TV ANTI-TIP DEVICE

(75) Inventor: John M. Green, East Otto, NY (US)

(73) Assignee: Bush Industries, Inc., Jamestown, NY (US)

( * ) Notice: Subject to any disclaimer, the term of this patent is extended or adjusted under 35 U.S.C. 154(b) by 0 days.

(21) Appl. No.: 11/968,856

(22) Filed: Jan. 3, 2008

(65) Prior Publication Data

US 2009/0173848 A1    Jul. 9, 2009

(51) Int. Cl.
*F16M 13/00* (2006.01)

(52) U.S. Cl. .................. 248/351; 248/121; 248/447

(58) Field of Classification Search ............... 248/125.8, 248/121, 351, 157, 447, 450, 472, 474, 917, 248/371, 919, 923
See application file for complete search history.

(56) References Cited

U.S. PATENT DOCUMENTS

| 1,815,928 | A | * | 7/1931 | Murphy ................. 248/125.8 |
| 3,574,981 | A | | 4/1971 | Henschen et al. |
| 4,304,078 | A | | 12/1981 | Meriwether, Jr. |
| 4,503,981 | A | | 3/1985 | Coronado |
| 5,839,303 | A | | 11/1998 | Umberg et al. |
| 6,478,275 | B1 | * | 11/2002 | Huang ................. 248/284.1 |
| 6,702,130 | B1 | * | 3/2004 | Carlilse ................. 211/204 |
| 6,854,222 | B2 | | 2/2005 | Hansort |
| 6,957,515 | B1 | | 10/2005 | Hatfield |
| 6,976,663 | B1 | | 12/2005 | Faulk |
| 7,510,155 | B2 | * | 3/2009 | Huang et al. ............. 248/278.1 |
| 2003/0223188 | A1 | | 12/2003 | Ha et al. |
| 2006/0273231 | A1 | * | 12/2006 | Huang ................. 248/371 |
| 2006/0278795 | A1 | * | 12/2006 | Lee ...................... 248/371 |
| 2006/0284031 | A1 | * | 12/2006 | Whalen et al. ............. 248/125.8 |
| 2007/0120024 | A1 | | 5/2007 | Oddsen, Jr. et al. |
| 2008/0023599 | A1 | * | 1/2008 | Lin ...................... 248/122.1 |
| 2008/0192417 | A1 | | 8/2008 | Hwang et al. |
| 2008/0277539 | A1 | * | 11/2008 | Lee et al. ................. 248/157 |
| 2009/0166502 | A1 | * | 7/2009 | Wang et al. ............... 248/423 |

* cited by examiner

*Primary Examiner*—Ramon O Ramirez
(74) *Attorney, Agent, or Firm*—The Webb Law Firm

(57) ABSTRACT

A support device for a flat appliance is disclosed. The support device includes a mounting plate having at least one hole defined therein. The mounting plate is adapted for attachment to a side of the flat appliance with a fastener extending through the at least one hole and into at least one corresponding receiving hole in the flat appliance. The device further includes a mounting bracket that is adapted for attachment to a stand structure. The device also includes a brace disposed between the mounting plate and the mounting bracket. The at least one hole in the mounting plate is adapted for accommodating the receiving hole of a variety of different flat appliances.

29 Claims, 6 Drawing Sheets

STABILITY SUPPORT TV ANTI-TIP DEVICE

BACKGROUND OF THE INVENTION

1. Field of the Invention

The present invention relates to a support device for stabilizing a flat appliance on a stand structure against displacement and tipping over. More specifically, the present invention relates to a stability support TV anti-tip device that is attached to a side of a flat appliance, particularly to a rear side of a flat screen television, by a mounting plate and attached to a stand structure by a mounting bracket. A brace is disposed between the mounting plate and the mounting bracket for securing the flat appliance against displacement and tipping over.

2. Description of Related Art

Flat appliances, especially flat screen televisions, are typically provided with a base portion extending from a bottom side or edge thereof. This base portion supports the flat appliance on a flat surface of a stand structure, typically a television stand or entertainment center. However, such base portions are typically small when compared with the overall height and width of the flat screen television. Moreover, the base portions typically do not extend more than an insignificant distance beyond the rear side of the flat screen television so that the television can be disposed closer to a rear edge of the stand structure. Further, such base portions are not attached to the stand structure.

There are several problematic disadvantages with such a construction since flat screen televisions tend to have a lighter weight than older tube-based televisions and are also proportionally much larger with respect to their base portions than older tube-based televisions. As such, flat screen televisions are prone to be being displaced from a desired orientation by being accidentally bumped or shaken or, more catastrophically, are prone to being accidentally tipped over and falling. Such problems can lead to the inconvenience of requiring frequent adjustment of the position of the flat screen television or lead to the flat screen television being damaged or destroyed in a fall from a standing position.

Accordingly, there is a general need for a support device for securing a flat appliance, especially a flat screen television or monitor, to a stand structure so as to prevent the flat appliance from being displaced from a desired position or from being accidentally tipped over while minimizing interference with the use of the flat appliance and minimizing damage to the stand structure.

SUMMARY OF THE INVENTION

It is an object of the present invention to provide a support device for securing a flat appliance, especially a flat screen television, to a stand structure so as to prevent the flat appliance from becoming displaced or from tipping over.

It is an object of the present invention to provide a support device that can be attached to a variety of different flat appliances having varying sizes and shapes.

It is an object of the present invention to provide a support device that can be attached to a variety of different stand structures at varying locations on the stand structure.

It is an object of the present invention to utilize a mounting plate that is attached to a side of a flat appliance by fasteners that engage pre-existing holes in the flat appliance, which are for mounting the flat appliance to a wall.

It is an object of the present invention to utilize a brace having an adjustable length and is pivotable with respect to the mounting plate and the mounting bracket such that the flat appliance can be disposed in a variety of different positions and orientations with respect to the stand structure.

According to an embodiment of the present invention, a support device for a flat appliance is provided. The support device comprises a mounting plate having at least one hole defined therein, the mounting plate being adapted for attachment to a side of the flat appliance with a fastener extending through the at least one hole and into at least one corresponding receiving hole in the flat appliance; a mounting bracket adapted for attachment to a stand structure; and a brace disposed between the mounting plate and the mounting bracket. The at least one hole in the mounting plate is adapted for accommodating the receiving hole of a variety of different flat appliances. Further, the mounting plate comprises a plurality of holes defined therein, the plurality of holes being arranged in an array suitable to accommodate a plurality of receiving holes of a variety of different flat appliances. The plurality of holes in the mounting plate are arranged in an array extending in two directions from a point of attachment between the brace and the mounting plate. Also, the brace has an adjustable length. The brace comprises a first leg and a second leg, the first and second legs being associated with each other in a telescoping engagement. A clamp mechanism is disposed on the brace at a point of telescoping engagement between the first and second legs of the brace, the clamp mechanism being adapted for securing the first and second legs of the brace to each other in a fixed telescoping engagement. The support device also includes a first hinged connection between the brace and the mounting plate and a second hinged connection between the brace and the mounting bracket. Also, the mounting plate is adapted for attachment to the side of the flat appliance with a plurality of fasteners engaging a plurality of holes in the mounting plate and the side of the flat appliance.

According to a further embodiment of the present invention, a system for securing a flat appliance to a stand structure is provided. The system comprises a flat appliance having opposing front and rear sides, opposing top and bottom sides and at least one receiving hole disposed in the rear side; a stand structure comprising a stand surface for supporting the flat appliance thereon; and a support device comprising: a mounting plate having at least one hole defined therein, the at least one hole in the mounting plate being arranged such that the at least one hole in the mounting plate aligns with the at least one receiving hole in the rear side of the flat appliance, the mounting plate being attached to the rear side of the flat appliance with a fastener extending through the at least one hole in the mounting plate and into the at least one receiving hole in the rear side of the flat appliance; a mounting bracket attached to the stand structure; and a brace disposed between the mounting plate and the mounting bracket. Further, the flat appliance comprises a plurality of receiving holes disposed in the rear side, the receiving holes being arranged in a horizontal array parallel to the top side, and the mounting plate comprises a plurality of holes defined therein, the plurality of holes in the mounting plate being arranged in an array such that at least two holes in the mounting plate align with at least two of the plurality of receiving holes in the rear side of the flat appliance. The array of holes in the mounting plate extends in two directions from a point of attachment between the brace and the mounting plate. Also, the brace has an adjustable length. The brace comprises a first leg and a second leg, the first and second legs being associated with each other in a telescoping engagement. A clamp mechanism is disposed on the brace at a point of telescoping engagement between the first and second legs of the brace, the clamp mechanism being adapted for securing the first and second legs of the brace to each other in a fixed telescoping engagement. The support device also includes a first hinged connection between said brace and said mounting plate and a second hinged connection between said brace and said mounting bracket. Particularly, the flat appliance is a flat screen television.

According to a further embodiment of the present invention, a kit for securing a flat appliance to a stand structure is provided. The kit comprises: a mounting plate adapted for attachment to the flat appliance, the mounting plate having at least one hole defined therein, the at least one hole being arranged such that the at least one hole in the mounting plate can be aligned with at least one receiving hole disposed in a side of the flat appliance; a mounting bracket adapted for attachment to the stand structure; a brace adapted for attachment to the mounting plate and the mounting bracket, the brace having an adjustable length; and at least one fastener for attaching the mounting plate to the flat appliance by engaging the aligned holes in the mounting plate and the flat appliance. The mounting plate is adapted for being attached to a variety of flat appliances having different arrangements of receiving holes and a length of the brace is adapted for being adjusted so as to secure flat appliances of varying sizes to varying stand structures at varying orientations. Further, the mounting plate comprises a plurality of elongated holes defined therein, the plurality of elongated holes being arranged in an array such that at least two holes in the mounting plate can be aligned with at least two receiving holes disposed in the side of the flat appliance. The array extends in two directions from a point of attachment between the brace and the mounting plate. The brace comprises a first leg and a second leg, the first and second legs being associated with each other in a telescoping engagement. The kit further includes a clamp mechanism adapted for being disposed on the brace at a point of telescoping engagement between the first and second legs of the brace, the clamp mechanism being adapted for securing the first and second legs of the brace to each other in a fixed telescoping engagement. Also, the brace is adapted for being hingedly attached to the mounting plate and the mounting bracket. Particularly, the flat appliance is a flat screen television.

Further details and advantages of the invention will become clear upon reading the following detailed description in conjunction with the accompanying drawing figures, wherein like parts are designated with like reference numerals throughout.

DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
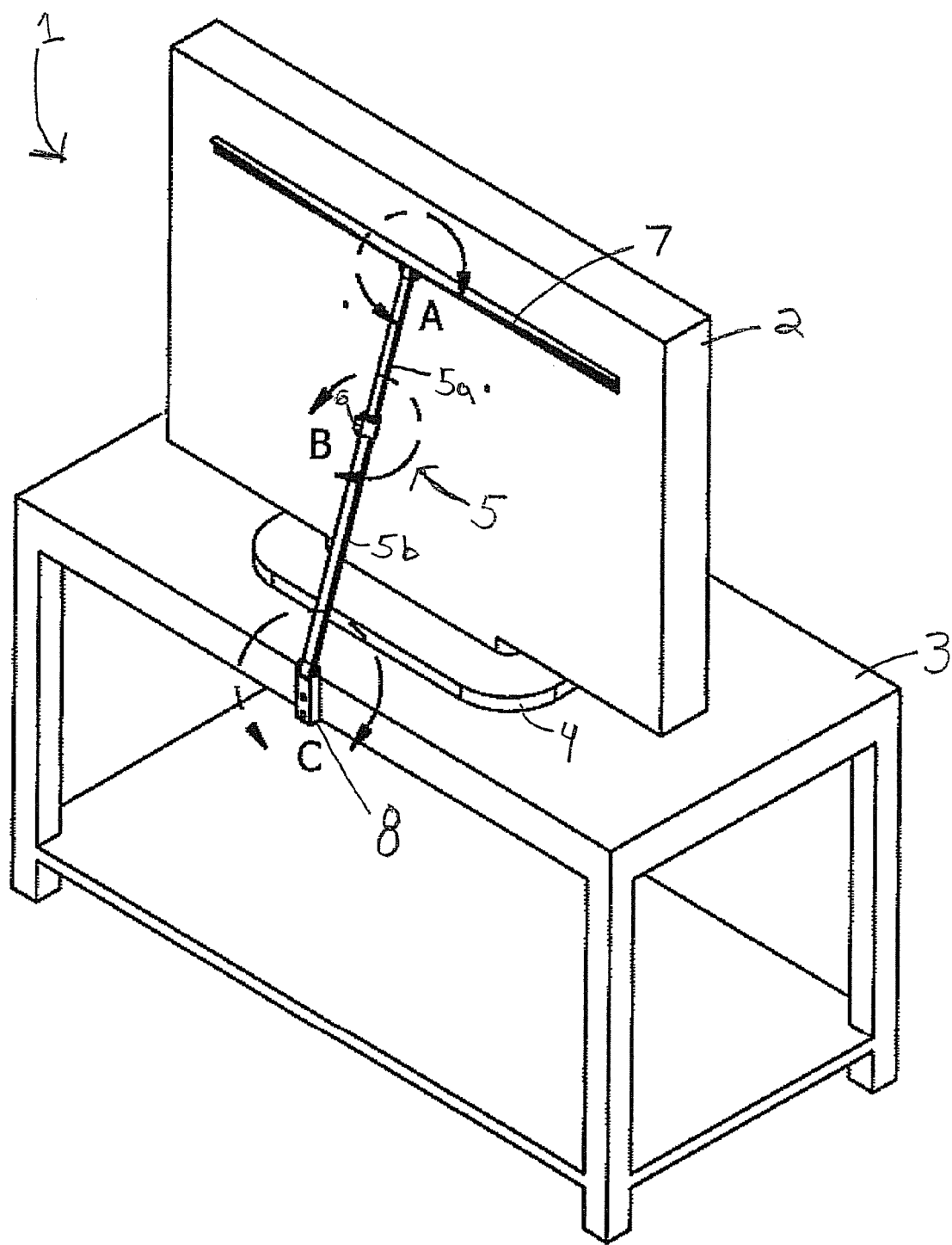
FIG. 1 depicts a perspective view of a flat appliance and stand having a stability support device attached thereto according to an embodiment of the present invention.

FIGS. 1-4 depict a support device 1 according to an embodiment of the present invention that serves to attach a flat appliance 2 to a stand structure 3 and prevent the flat appliance 2 from tipping over or being displaced from a desired position. As shown in FIG. 1, support device 1 includes a brace 5 disposed between a mounting plate 7, which is attached to a side of the flat appliance 2, and a mounting bracket 8, which is attached to the stand structure 3. The flat appliance 2 includes opposing front and rear sides and opposing top and bottom sides and a base portion 4 that supports the flat appliance 2 on a flat support surface of the stand structure 3.

The brace 5 has an adjustable length and includes a top telescoping brace leg 5a and a bottom telescoping brace leg 5b. Telescoping brace legs 5a, 5b are in a telescoping engagement such that top brace leg 5a is partially disposed within, and slides with respect to, bottom brace leg 5b. Top brace leg 5a has a preferred length of 17 inches. Bottom brace leg 5b has a preferred length of 16 inches. A clamp mechanism 6 is disposed on the brace 5 at a point of telescoping engagement between the top and bottom brace legs 5a, 5b. The clamp mechanism 6 serves to secure the top and bottom brace legs 5a, 5b together in a fixed telescoping engagement.

Figure 2:
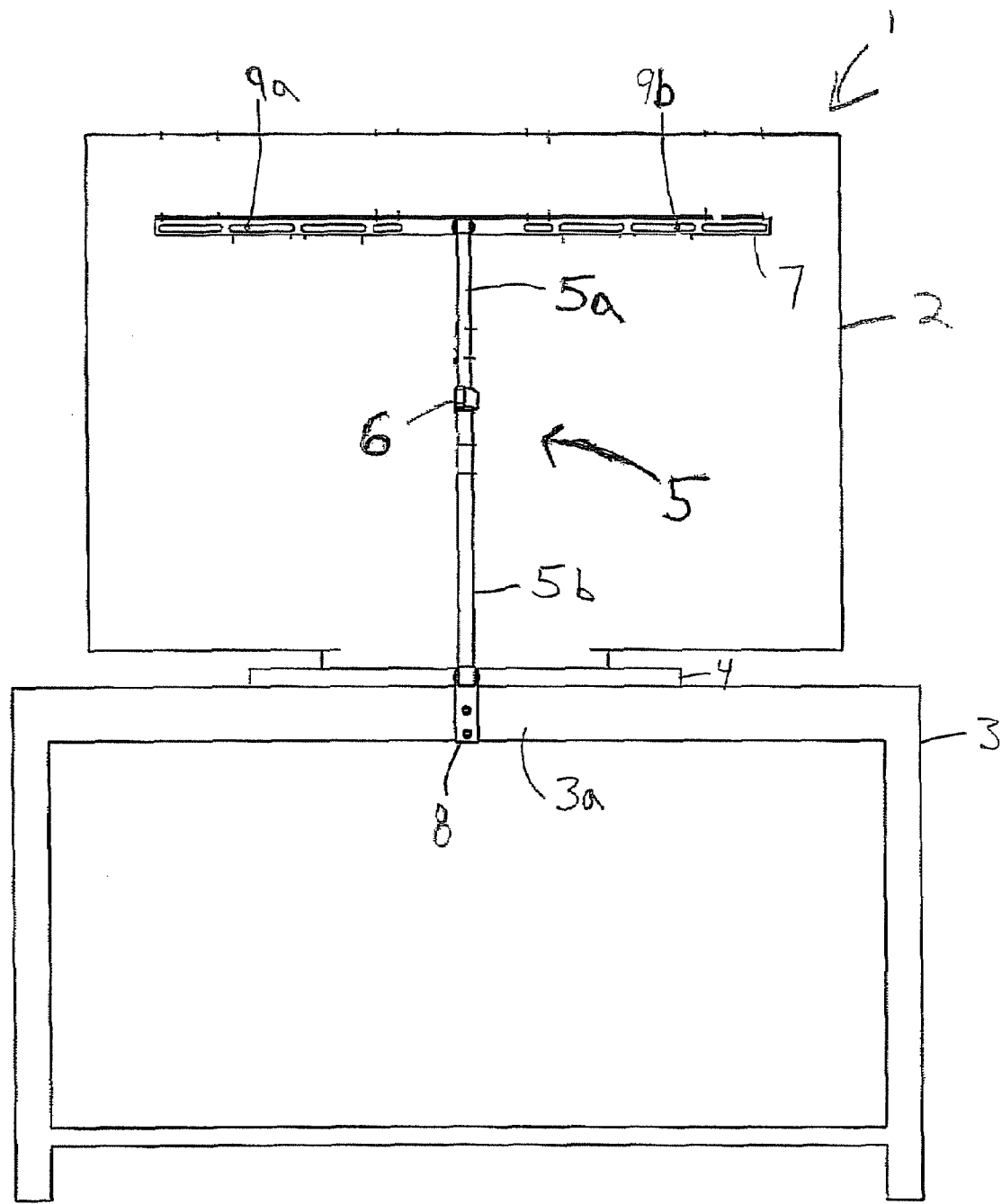
FIG. 2 depicts a rear side view of a flat appliance and stand having a stability support device attached thereto according to an embodiment of the present invention.

As shown in FIG. 2, mounting plate 7 is generally rectangular. It is attached to the flat appliance 2 by threaded fasteners 9a, 9b that extend through holes 7a-7h (shown in FIG. 7) in the mounting plate and into receiving holes disposed in a rear side of the flat appliance 2. These receiving holes are pre-installed in the rear side of the flat appliance 2 in a horizontal array extending parallel to the top side of the flat appliance so that flat appliance 2 can be mounted to a wall. Mounting plate 7 is attached to the rear side of flat appliance 2 so as to be oriented parallel with respect to a top edge of the flat appliance 2. Mounting bracket 8 is attached to a portion 3a of the stand structure 3 by fasteners drilled into the portion 3a of the stand structure. It is to be appreciated that portion 3a can be any part of the stand structure 3 suitable for having mounting bracket 8 attached thereto, including a top rear portion, as shown in FIG. 2.

Figure 3:
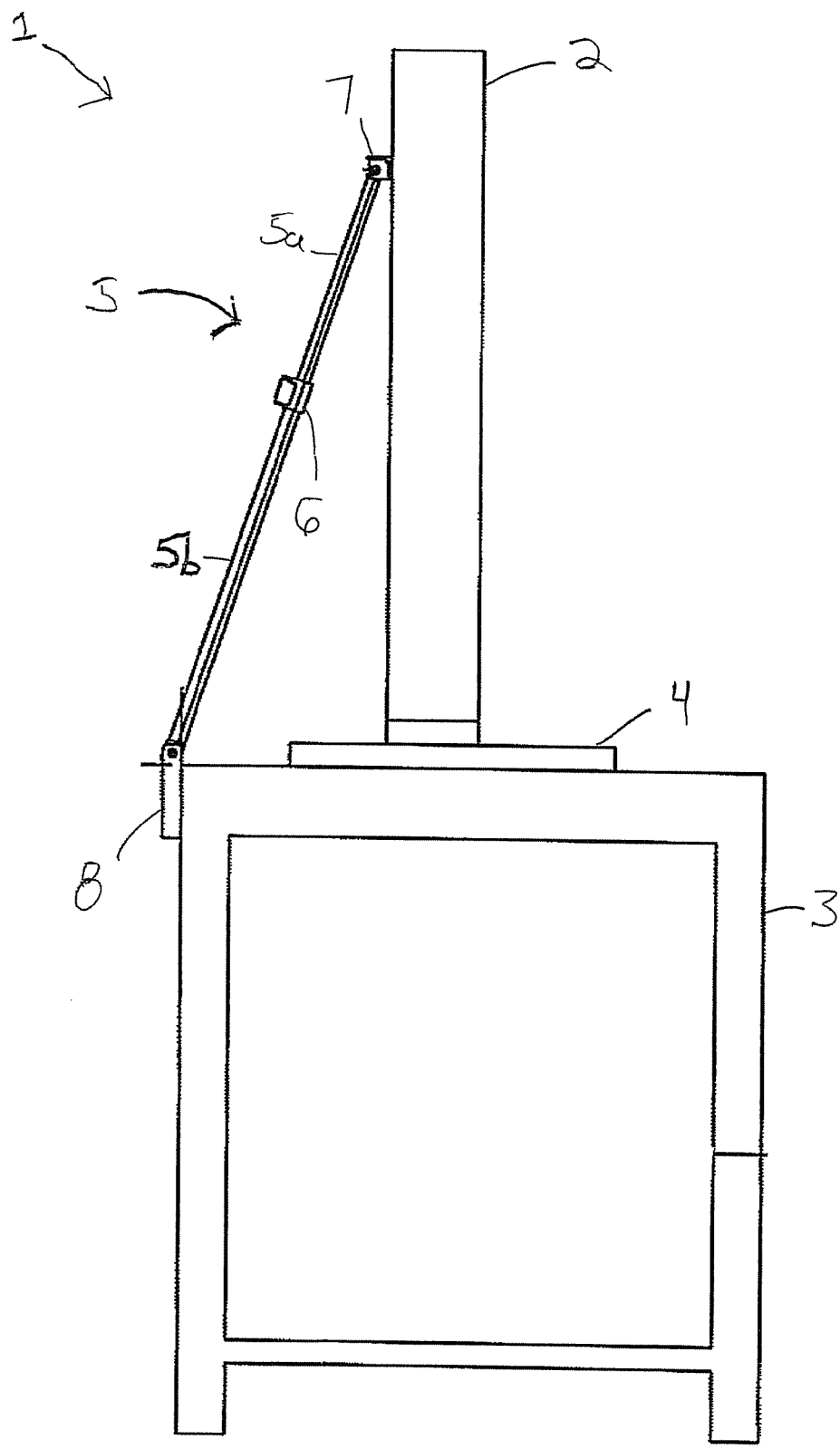
FIG. 3 depicts a side view of a flat appliance and stand having a stability support device attached thereto according to an embodiment of the present invention.
Figure 4:
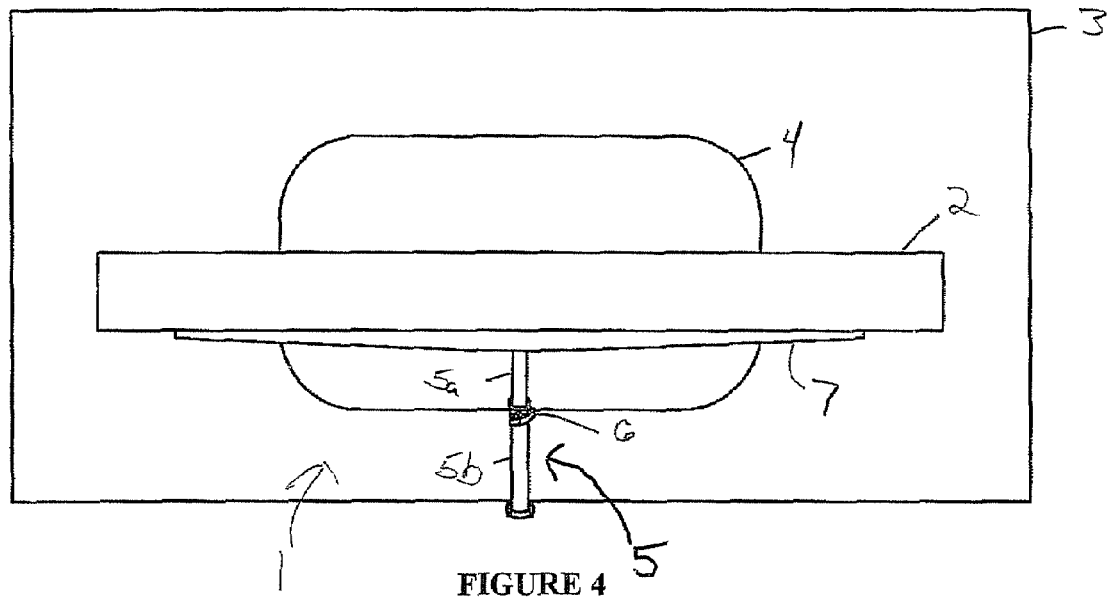
FIG. 4 depicts a top side view of a flat appliance and stand having a stability support device attached thereto according to an embodiment of the present invention.

As shown in FIG. 3, brace 5 extends downward and outward with respect to flat appliance 2 so as to connect mounting plate 7 and mounting bracket 8 to one another in order to secure flat appliance 2 to the stand structure 3 and prevent flat appliance 2 from tipping over.

Figure 5A:
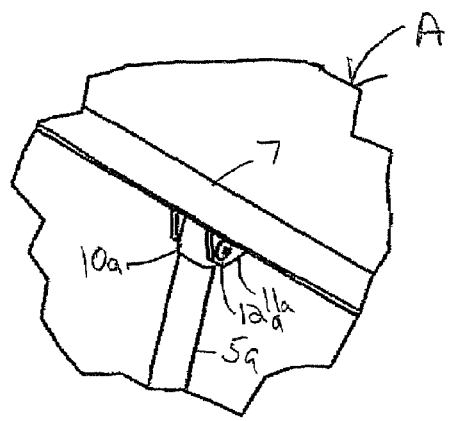
FIG. 5A depicts a more detailed view of area "A", shown in FIG. 1.

With reference to FIG. 5A, a detailed view of area "A" in FIG. 1 depicting the connection between top brace leg 5a and mounting plate 7 is shown. A top brace leg end cap 10a is slipped over the top of top brace leg 5a. Mounting plate 7 includes a top hinge bracket 11a disposed at a middle portion thereof. Top brace leg 5a is hingedly connected to mounting plate 7 at top hinge bracket 11a by a top hinge fastener 12a passing through top hinge bracket 11a, top brace leg end cap 10a and top brace leg 5a. This connection is pivotal and is rotationally unrestrained within a limited range about at least one axis.

Figure 5B:
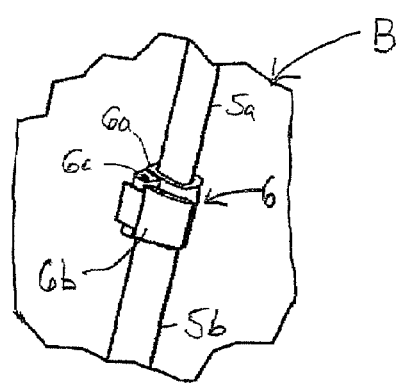
FIG. 5B depicts a more detailed view of area "B", shown in FIG. 1.

With reference to FIG. 5B, a detailed view of area "B" in FIG. 1 depicting the point telescoping engagement between top brace leg 5a and bottom brace leg 5b is shown. Clamp mechanism 6 is disposed on brace 5 at the point of telescoping engagement between the top and bottom brace legs 5a, 5b. Clamp mechanism 6 includes a flexible sleeve portion 6a disposed over the top and bottom brace legs 5a, 5b, a tab portion 6b and a hinge portion 6c. Tab portion 6b includes a rigid extension (not shown) and is pivoted about hinge portion 6c so as to cause the rigid extension to abut against flexible sleeve portion 6a. Flexible sleeve portion 6a is thus caused to tighten upon top and bottom brace legs 5a, 5b at a point of telescoping engagement between the legs 5a, 5b. It is to be understood that the clamp mechanism may be of any type according to those known to one of ordinary skill in the art, including one or more self-adhesive wire clips.

Figure 5C:
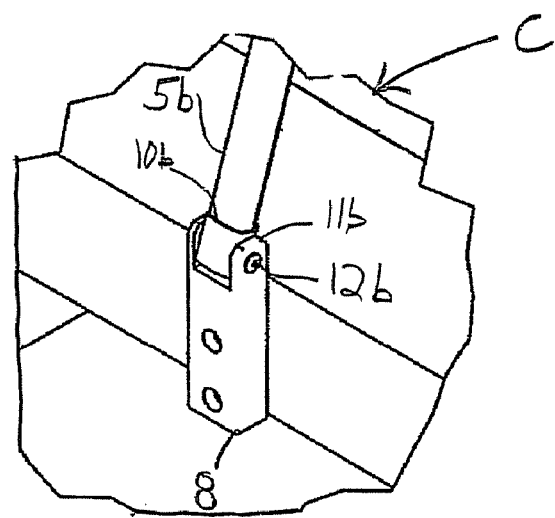
FIG. 5C depicts a more detailed view of area "C", shown in FIG. 1.

With reference to FIG. 5C, a detailed view of area "C" in FIG. 1 depicting the connection between bottom brace leg 5b and mounting bracket 8 is shown. A bottom brace leg end cap 10b is slipped over the bottom of bottom brace leg 5b. Mounting bracket 8 includes a bottom hinge bracket 11b disposed on an end thereof. Bottom brace leg 5b is hingedly connected to mounting bracket 8 at bottom hinge bracket 11b by a bottom hinge fastener 12b passing through bottom hinge bracket 11b, bottom brace leg end cap 10b and bottom brace leg 5b. This connection is pivotal and is rotationally unrestrained within a limited range about at least one axis.

Figure 6:
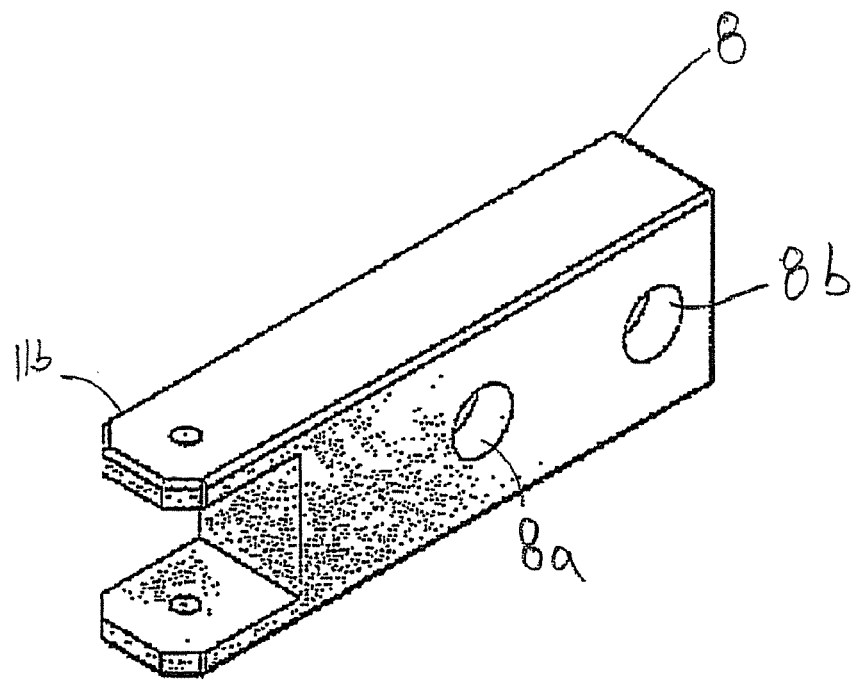
FIG. 6 depicts a detailed perspective view of a mounting bracket for a stability support device according to an embodiment of the present invention.

As shown in FIG. 6, mounting bracket 8 includes bottom hinge portion 11b disposed at an end thereof and two holes 8a, 8b disposed in a side thereof. A pair of fasteners are passed through holes 8a, 8b of mounting bracket 8 and are drilled into the portion 3a of stand structure 3 so as to attach mounting bracket 8 to stand structure 3.

Figure 7:
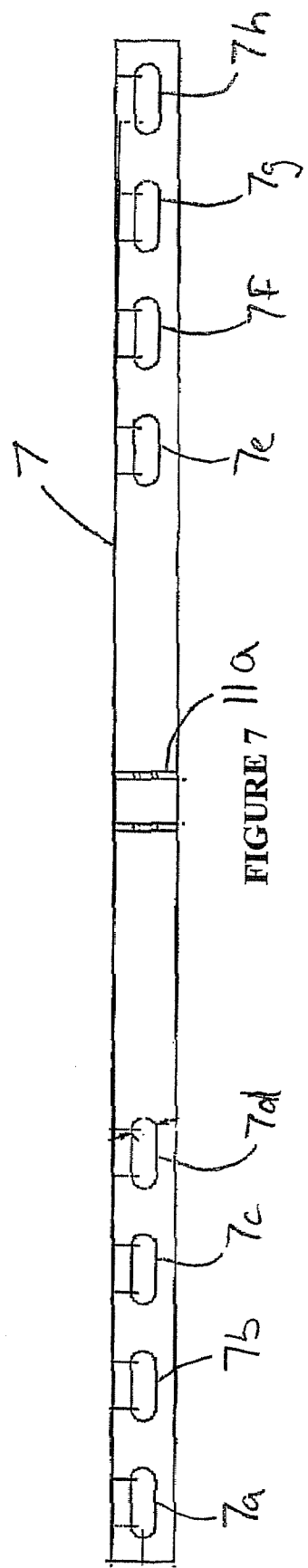
FIG. 7 depicts a detailed side view of a mounting plate for a stability support device according to an embodiment of the present invention.

As shown in FIG. 7, mounting plate 7 includes a top hinge portion 11a, disposed in a middle portion thereof and an array of elongated holes 7a-7h defined in the mounting plate 7 and extending in two directions from a point of attachment between the brace 5 and mounting plate 7. Holes 7a-7h are arranged within mounting plate 7 in an array so as to be capable of accommodating and aligning with a variety of arrays of receiving holes in a side of a variety of different flat appliances 2. Further, holes 7a-7h may be formed of an elongated shape so as to provide tolerance in aligning two or more holes 7a-7h with two or more corresponding receiving holes in the side of flat appliance 2.

In a further embodiment of the present invention, a kit for securing a flat appliance 2 to a stand structure 3 is provided. The kit includes a mounting plate 7, mounting bracket 8, brace 5 and at least one fastener for attaching the mounting plate 7 to a side of the flat appliance 2 by engaging at least one hole defined in the mounting plate 7 aligned with at least one receiving hole disposed in a side of the flat appliance, as detailed above. According to this embodiment, mounting plate 7 may be attached to a variety of flat appliances 2 having different arrangements of receiving holes. The length of brace 5 is adjustable so that flat appliances of varying types and sizes can be secured to varying support structures at varying orientations.

It is to be appreciated that the support device 1 may be used to attach any type of flat appliance 2 to a stand structure 3 in order to prevent tipping or displacement of the flat appliance 2. Such flat appliances 2 may include flat screen television sets and monitors, video game consoles, computers, etc. Further, stand structure 3 may be of any type known in the art to be suitable for supporting a flat appliance 2 thereon, including television stands, entertainment centers, desks, tables, dressers, etc. Moreover, flat appliance 2 may be supported on stand structure 3 in a variety of positions with respect to distance from the edges of the stand structure 3 and/or the direction the flat appliance 2 faces with respect to the stand structure 3. Also, top and bottom brace legs 5a, 5b may be of any suitable construction, including extruded tubing.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A support device for a flat appliance having a base resting upon a surface of a structure, wherein the base is separate from and not attached to the structure, comprising:
   a mounting plate having at least one hole defined therein, said mounting plate being adapted for removable attachment to a side of the flat appliance with a fastener extending through said at least one hole and into at least one corresponding receiving hole in the flat appliance;
   a mounting bracket adapted for attachment to a structure; and
   a brace disposed between said mounting plate and said mounting bracket,
   wherein the mounting plate is secured to the brace with a pivotal connection, wherein the pivotal connection is rotationally unrestrained within a limited range about at least one axis;
   wherein the mounting bracket is secured to the brace with a pivotal connection, wherein the pivotal connection is rotationally unrestrained within a limited range about at least one axis; and
   wherein said at least one hole in said mounting plate is adapted for accommodating at least one receiving hole of a variety of different flat appliances for attaching the mounting plate to the appliance.

2. The support device according to claim 1, wherein said mounting plate comprises a plurality of holes defined therein, said plurality of holes being arranged in an array suitable to accommodate a plurality of receiving holes of a variety of different flat appliances.

3. The support device according to claim 2, wherein said plurality of holes in said mounting plate are arranged in an array extending in two directions from a point of attachment between said brace and said mounting plate.

4. The support device according to claim 2, wherein the array of holes lies along a straight line.

5. The support device according to claim 4, wherein the pivotal connections are rotationally unrestrained within a limited range about an axis parallel to the straight line defined by the array of holes.

6. The support device according to claim 1, wherein said brace has an adjustable length.

7. The support device according to claim 6, wherein said brace comprises a first leg and a second leg, said first and second legs being associated with each other in a telescoping engagement.

8. The support device according to claim 7, further comprising a clamp mechanism disposed on said brace at a point of telescoping engagement between said first and second legs of said brace, said clamp mechanism being adapted for securing said first and second legs of said brace to each other in a fixed telescoping engagement.

9. The support device according to claim 1, wherein said mounting plate is adapted for attachment to the side of the flat appliance with a plurality of fasteners engaging a plurality of holes in said mounting plate and the side of the flat appliance.

10. The support device according to claim 1, wherein the structure to which the mounting bracket is adapted to be attached is a stand.

11. A system for securing a flat appliance to a structure, said system comprising:
a flat appliance having a base, opposing front and rear sides, opposing top and bottom sides and at least one receiving hole disposed in said rear side;
a structure comprising a stand surface, wherein the base of the appliance is separate from and not attached to the structure and rests upon the surface; and
a support device comprising:
a mounting plate having at least one hole defined therein, said at least one hole in said mounting plate being arranged such that said at least one hole in said mounting plate aligns with said at least one receiving hole in said rear side of said flat appliance, said mounting plate being removably attached to said rear side of said flat appliance with a fastener extending through said at least one hole in said mounting plate and into said at least one receiving hole in said rear side of said flat appliance;
a mounting bracket attached to a structure;
a brace disposed between said mounting plate and said mounting bracket; and
wherein the mounting plate is secured to the brace with a pivotal connection, wherein the pivotal connection is rotationally unrestrained within a limited range about at least one axis; and
wherein the mounting bracket is secured to the brace with a pivotal connection, wherein the pivotal connection is rotationally unrestrained within a limited range about at least one axis, such that the brace restrains the appliance and inhibits tipping.

12. The system according to claim 11, wherein said flat appliance comprises a plurality of receiving holes disposed in said rear side, said receiving holes being arranged in a horizontal array parallel to said top side, and said mounting plate comprises a plurality of holes defined therein, said plurality of holes in said mounting plate being arranged in an array such that at least two holes in said mounting plate align with at least two of said plurality of receiving holes in said rear side of said flat appliance.

13. The system according to claim 12, wherein said array of holes in said mounting plate extends in two directions from a point of attachment between said brace and said mounting plate.

14. The system according to claim 12, wherein the array of holes lies along a straight line.

15. The system according to claim 14, wherein the pivotal connections are rotationally unrestrained within a limited range about an axis parallel to the straight line defined by the array of straight holes.

16. The system according to claim 11, wherein said brace has an adjustable length.

17. The system according to claim 16, wherein said brace comprises a first leg and a second leg, said first and second legs being associated with each other in a telescoping engagement.

18. The system according to claim 17, further comprising a clamp mechanism disposed on said brace at a point of telescoping engagement between said first and second legs of said brace, said clamp mechanism being adapted for securing said first and second legs of said brace to each other in a fixed telescoping engagement.

19. The system according to claim 11, wherein said flat appliance is a flat screen television.

20. The system according to claim 11, wherein the structure to which the mounting bracket is adapted to be attached is a stand.

21. A kit for securing a flat appliance having a base to a structure, wherein the flat appliance has a base separate from and not attached to the structure which rests upon a surface of a structure, said kit comprising:
a generally rectangular mounting plate adapted for attachment to the flat appliance, said mounting plate having at least one hole defined therein, said at least one hole being arranged such that said at least one hole in said mounting plate can be aligned with at least one receiving hole disposed in a side of the flat appliance;
a mounting bracket adapted for attachment to a structure;
a brace attached to said mounting plate and to said mounting bracket, said brace having an adjustable length; and
at least one fastener for attaching said mounting plate to said flat appliance by engaging said aligned holes in said mounting plate and said flat appliance;
wherein said mounting plate is adapted for being removably attached to a variety of flat appliances having different arrangements of receiving holes and a length of said brace is adapted for being adjusted so as to secure flat appliances of varying sizes to varying stand structures at varying orientations;
wherein the mounting plate is secured to the brace with a pivotal connection, wherein the pivotal connection is rotationally unrestrained within a limited range about at least one axis; and
wherein the mounting bracket is secured to the brace with a pivotal connection, wherein the pivotal connection is rotationally unrestrained within a limited range about at least one axis.

22. The kit according to claim 21, wherein said mounting plate comprises a plurality of elongated holes defined therein, said plurality of elongated holes being arranged in an array such that at least two holes in said mounting plate can be aligned with at least two receiving holes disposed in the side of the flat appliance.

23. The kit according to claim 22, wherein said array extends in two directions from a point of attachment between said brace and said mounting plate.

24. The kit according to claim 21, wherein said brace comprises a first leg and a second leg, said first and second legs being associated with each other in a telescoping engagement.

25. The kit according to claim 24, further comprising a clamp mechanism adapted for being disposed on said brace at a point of telescoping engagement between said first and second legs of said brace, said clamp mechanism being adapted for securing said first and second legs of said brace to each other in a fixed telescoping engagement.

26. The kit according to claim 21, wherein the array of holes lies along a straight line.

27. The kit according to claim 26, wherein the pivotal connections are rotationally unrestrained within a limited range about an axis parallel to the straight line defined by the array of straight holes.

28. The kit according to claim 21, wherein said flat appliance is a flat screen television.

29. The kit according to claim 21, wherein the structure to which the mounting bracket is adapted to be attached is a stand.

* * * * *

UNITED STATES PATENT AND TRADEMARK OFFICE
CERTIFICATE OF CORRECTION

PATENT NO. : 7,740,218 B2
APPLICATION NO. : 11/968856
DATED : June 22, 2010
INVENTOR(S) : Green It is certified that error appears in the above-identified patent and that said Letters Patent is hereby corrected as shown below:

Column 7, Line 16, Claim 11, "a stand surface" should read -- a surface --

Column 8, Lines 28-29, Claim 21, "varying stand structures" should read -- varying structures --

Signed and Sealed this

Third Day of August, 2010

David J. Kappos
*Director of the United States Patent and Trademark Office*